(12) United States Patent
Gim et al.

(10) Patent No.: US 12,325,468 B2
(45) Date of Patent: Jun. 10, 2025

(54) REAR VEHICLE BODY CONNECTION STRUCTURE

(71) Applicants: Hyundai Motor Company, Seoul (KR); Kia Corporation, Seoul (KR)

(72) Inventors: Seokju Gim, Seongnam-si (KR); Heedae Oh, Suwon-si (KR); Joon Tak Park, Gunpo-si (KR); Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 359 days.

(21) Appl. No.: 17/976,454

(22) Filed: Oct. 28, 2022

(65) Prior Publication Data
US 2023/0182826 A1    Jun. 15, 2023

(30) Foreign Application Priority Data
Dec. 9, 2021    (KR) .................. 10-2021-0175336

(51) Int. Cl.
B62D 25/08    (2006.01)
B62D 25/20    (2006.01)
B62D 27/02    (2006.01)

(52) U.S. Cl.
CPC ......... B62D 25/2027 (2013.01); B62D 25/08 (2013.01); B62D 27/023 (2013.01)

(58) Field of Classification Search
CPC .. B62D 25/08; B62D 25/2027; B62D 27/023; B62D 27/065; B62D 24/00; B60Y 2306/01; B60J 5/107

USPC ...... 296/203.01, 4, 193.08, 35.1, 0.3, 29, 30
See application file for complete search history.

(56) References Cited

U.S. PATENT DOCUMENTS

| 4,969,690 | A  | * | 11/1990 | Smith | B62D 53/045 |
| | | | | | 296/35.3 |
| 8,383,242 | B2 | * | 2/2013 | Malek | B60N 2/686 |
| | | | | | 114/355 |
| 9,139,237 | B1 | * | 9/2015 | Ganti | B62D 21/09 |

FOREIGN PATENT DOCUMENTS

DE    19639895 B4 * 12/2009 ........... B62D 23/005

OTHER PUBLICATIONS

DE19639895 Text (Year: 2009).*

* cited by examiner

*Primary Examiner* — Dennis H Pedder
(74) *Attorney, Agent, or Firm* — Slater Matsil, LLP

(57) ABSTRACT

An embodiment is a vehicle body including a vehicle body skeleton including a tail gate frame and a rear side member connected to a lower portion of the tail gate frame, a chassis frame including a longitudinal frame disposed in the length direction of the vehicle body, and a vehicle body rear connection structure configured to connect the vehicle body skeleton and the chassis frame, wherein the longitudinal frame is connected to an intersecting position of the lower portion of the tail gate frame and the rear side member.

20 Claims, 8 Drawing Sheets

REAR VEHICLE BODY CONNECTION STRUCTURE

CROSS-REFERENCE TO RELATED APPLICATIONS

This application claims priority to and the benefit of Korean Patent Application No. 10-2021-0175336 filed in the Korean Intellectual Property Office on Dec. 9, 2021, which application is incorporated herein by reference.

TECHNICAL FIELD

The present invention relates to a vehicle body rear connection structure.

BACKGROUND

A general vehicle body rear mounting structure is a structure assembled through a bulk head and bolts inside both ends of the lower cross member of the back panel at the rear of the vehicle body.

However, the rear mounting structure of a general chassis frame is positioned at both ends of the back panel member of the vehicle body and is configured at an independent part separated from the rear side member. As a result, the load input part and the load transfer path are inconsistent, and performance improvement such as durability and strength of the vehicle may be disadvantageous.

That is, the rear side member is connected to the bottom of the back panel member in a straight line from the bottom of the body floor, and the chassis frame is spaced apart from the rear side member and positioned on the side of the body.

This is a structure that is unfavorable to securing effective strength performance because the chassis frame mounting position, the load input part, is not positioned in the annular structure of the tail gate and the load transfer path of the rear side member.

In addition, since the connection between the rear floor and the quarter side and the rear floor and back panel is cut off due to the welding structure, it is difficult to secure the strength of the mounting part only with the bulk head box cross-section.

The above information disclosed in this background section is only for enhancement of understanding of the background of the invention, and therefore it may contain information that does not form the prior art that is already known to a person of ordinary skill in the art.

SUMMARY

The present invention relates to a vehicle body rear connection structure. More particularly, the present invention relates to a vehicle body rear connection structure with increased vehicle torsional strength at the rear of the vehicle body.

Embodiments of the present invention has been made in an effort to provide a vehicle body rear connection structure with increased vehicle torsional strength at the rear of the vehicle body.

A vehicle body rear connection structure according to an exemplary embodiment of the present invention may be applied to connect a vehicle body skeleton including a tail gate frame and a rear side member connected to a lower portion of the tail gate frame and a chassis frame including a longitudinal frame disposed in the length direction of the vehicle body.

The longitudinal frame may be connected to an intersecting position of the lower portion of the tail gate frame and the rear side member.

The lower portion of the tail gate frame may include a back panel member, and a rear cross member connected to the upper portion of the back panel member.

The tail gate frame may have a closed loop shape.

The rear side member may include a rear side main body formed in the vehicle body length direction, a rear side connection body bent in the width direction of the vehicle body from the rear side main body, and a rear side end body that bends from the rear side connection body and is connected with the lower portion of the tail gate frame. The rear side connection body may have a shape curved in the rear and outward direction of the vehicle body.

The vehicle body rear connection structure according to an exemplary embodiment of the present invention may further include a chassis frame bracket connecting the longitudinal frame and the rear side end body.

The vehicle body rear connection structure according to an exemplary embodiment of the present invention may further include a connection bolt connecting the rear side end body and the chassis frame bracket.

The vehicle body rear connection structure according to an exemplary embodiment of the present invention may further include a mounting bulk head that is provided inside the rear side end body and connected with the connection bolt.

The vehicle body rear connection structure according to an exemplary embodiment of the present invention may further include a rear floor panel provided at the rear of the vehicle body, and the rear side member may include a side member flange connected with the rear floor panel, and a side member protrude body bent from the side member flange. And the mounting bulk head may be connected with the side member flange and the side member protrude body.

The vehicle body rear connection structure according to an exemplary embodiment of the present invention may further include a gusset bracket connecting the rear floor panel and the lower portion of the tail gate frame at the upper portion of the mount position of the connection bolt.

The gusset bracket may include a gusset flange connected to the rear floor panel and the lower portion of the tail gate frame, and a gusset protrude portion protruded from the gusset flange.

The gusset bracket and the rear floor panel, and the rear side member and the mounting bulk head may form a double cross-section respectively, at adjacent positions.

According to the vehicle body rear connection structure according to an exemplary embodiment of the present invention, it is possible to increase the vehicle torsional strength of the rear of the vehicle body.

According to the vehicle body rear connection structure according to an exemplary embodiment of the present invention, it is possible to strengthen the coupling of the closed shape structure of the rear opening and the rear floor and the side member with respect to the vehicle body to which the skateboard (chassis frame) is applied. Through this, the durability of the mounting part may be enhanced, and the torsional strength of the vehicle may be enhanced.

In addition, the effects obtainable or predicted by the embodiments of the present invention are to be disclosed directly or implicitly in the detailed description of the embodiments of the present invention. That is, various effects predicted according to an embodiment of the present invention will be disclosed in the detailed description to be described later.

BRIEF DESCRIPTION OF THE DRAWINGS

Since these drawings are for reference in explaining an exemplary embodiment of the present invention, the technical idea of the present invention should not be construed as being limited to the accompanying drawings.

Figure 1:
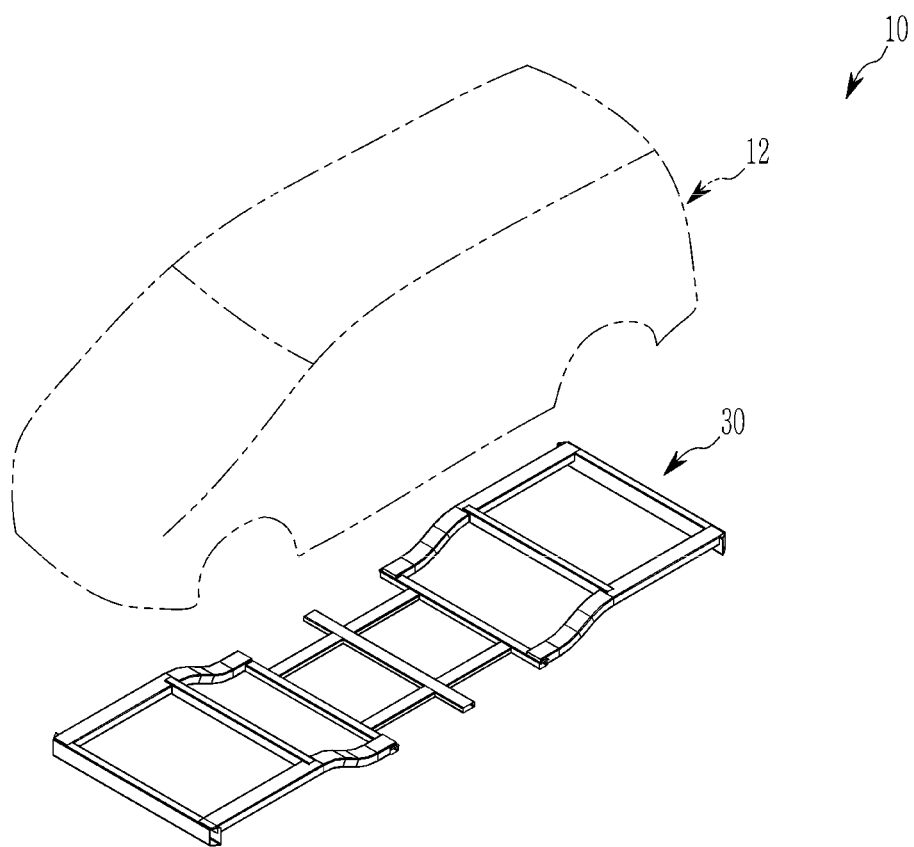
FIG. 1 is an exploded perspective view of a vehicle body to which a vehicle body rear connection structure according to an exemplary embodiment of the present invention may be applied.

The following reference identifiers may be used in connection with the accompanying drawings to describe exemplary embodiments of the present disclosure.

| <Description of symbols> | |
|---|---|
| 10: vehicle body | 12: vehicle body skeleton |
| 20: tail gate frame | 22: side quarter |
| 24: rear loop member | 26: back panel member |
| 28: rear cross member | 30: chassis frame |
| 32: longitudinal frame | 40: rear side member |
| 42: rear side main body | 44: rear side connection body |
| 46: rear side end body | 50: side member flange |
| 52: side member protrude body | 54: rear side cross member |
| 60: chassis frame bracket | 62: bracket panel |
| 70: connection bolt | 80: mounting bulk head |
| 90: rear floor panel | 100: gusset bracket |
| 102: gusset flange | 104: gusset protrude portion |
| C1, C2: first, second closed cross-section | |

DETAILED DESCRIPTION OF ILLUSTRATIVE EMBODIMENTS

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly describe the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to that shown in the drawings, and the thickness is enlarged to clearly express various parts and regions.

In addition, in the following detailed description, the names of the components are divided into first, second, and the like to distinguish them in the same relationship, and the order is not necessarily limited in the following description.

Throughout the specification, when a part includes a certain component, it means that other components may be further included, rather than excluding other components, unless otherwise stated.

In addition, terms such as part or means described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

An exemplary embodiment of the present invention will hereinafter be described in detail with reference to the accompanying drawings.

FIG. 1 is an exploded perspective view of a vehicle body to which a vehicle body rear connection structure according to an exemplary embodiment of the present invention may be applied.

Referring to FIG. 1, a vehicle body 10 to which a vehicle body rear connection structure according to an exemplary embodiment of the present invention may be applied may include a vehicle body skeleton 12 (Body-In-White) and a chassis frame 30.

The chassis frame 30 may be equipped with front suspension, rear suspension, battery module, and drivetrain.

Figure 2:
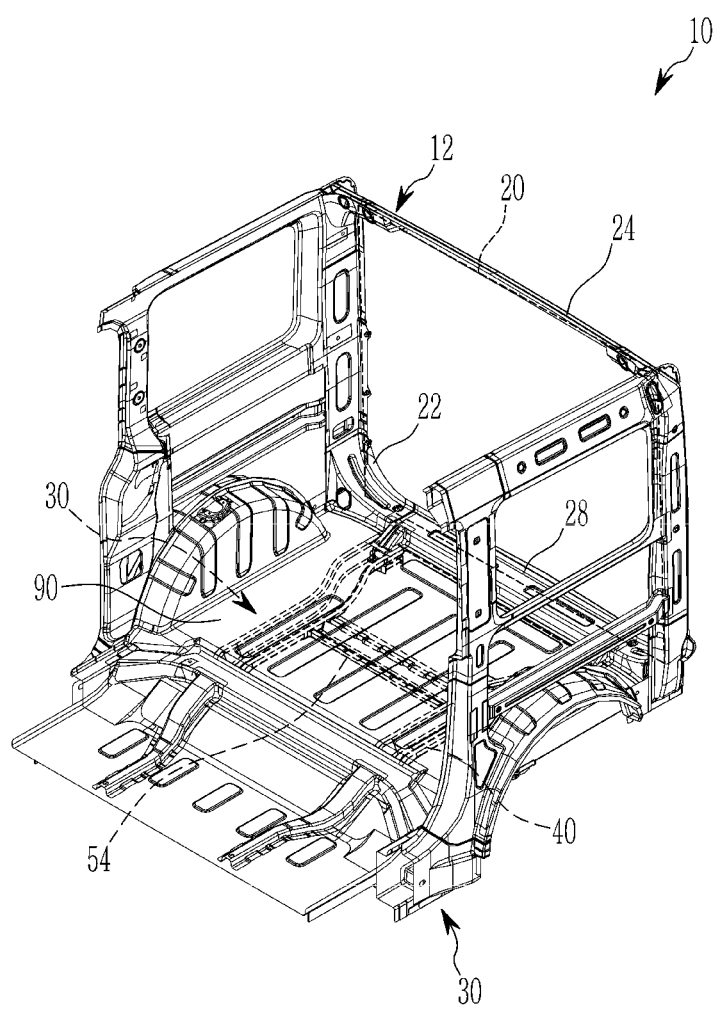
FIG. 2 is a partially exploded perspective view of a vehicle body to which a vehicle body rear connection structure according to an exemplary embodiment of the present invention may be applied.
Figure 3:
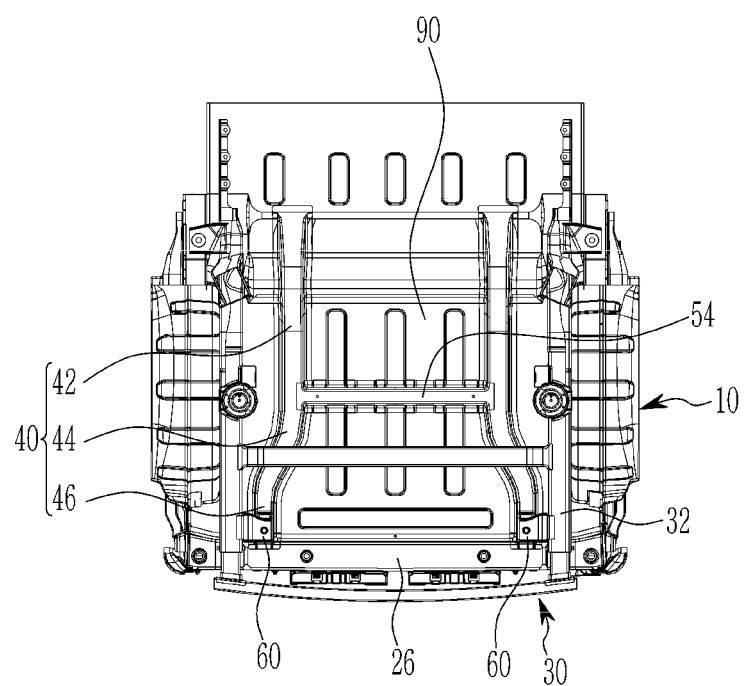
FIG. 3 is a partial bottom view of the vehicle body to which a vehicle body rear connection structure according to an exemplary embodiment of the present invention is applied.

FIG. 2 is a partially exploded perspective view of a vehicle body to which a vehicle body rear connection structure according to an exemplary embodiment of the present invention may be applied, and FIG. 3 is a partial bottom view of the vehicle body to which a vehicle body rear connection structure according to an exemplary embodiment of the present invention is applied.

Referring to FIG. 2 and FIG. 3, the vehicle body skeleton 12 may include a tail gate frame 20 and a rear side member 40 connected to a lower portion of the tail gate frame 20.

The lower portion of the tail gate frame 20 may include a back panel member 26 and a rear cross member 28 connected to the upper portion of the back panel member 26.

In addition, the tail gate frame 20 may include a side quarter 22 connected to the rear cross member 28 in a vertical direction of the vehicle body 10 and a rear loop member 24 connected to the side quarter 22 in a width direction of the vehicle body 10.

That is, the tail gate frame 20 may have a closed loop shape.

The chassis frame 30 may include a longitudinal frame 32 disposed in the length direction of the vehicle body 10.

The vehicle body rear connection structure according to an exemplary embodiment of the present invention may be applied to secure the connection force of the mounting part connecting the vehicle body skeleton 12 and the chassis frame 30.

In an exemplary embodiment of the vehicle body rear connection structure according to the present invention, the longitudinal frame 32 may be connected to an intersecting position of the lower portion of the tail gate frame 20 and the rear side member 40.

The rear side member 40 may include a rear side main body 42 formed in the vehicle body 10 length direction, a rear side connection body 44 bent in the width direction of the vehicle body 10 from the rear side main body 42, and a rear side end body 46 that bends from the rear side connection body 44 and is connected with the lower part of the tail gate frame 20.

That is, the rear side connection body 44 may have a shape curved in the rear and outward direction of the vehicle body 10.

The rear side member 40 is provided with two in the length direction of the vehicle body 10, and the vehicle body rear connection structure according to an exemplary embodiment of the present invention may further include a rear side cross member 54 connecting the two rear side member 40.

Figure 4:
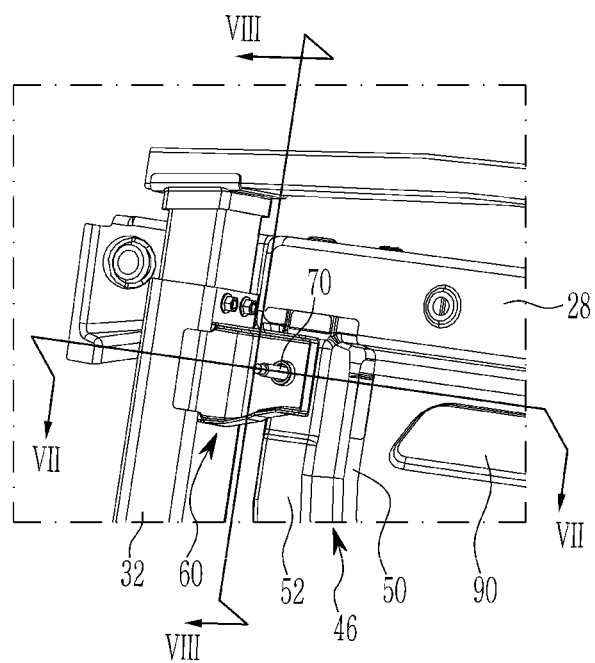
FIG. 4 is a partial perspective view viewed from the bottom of the vehicle body rear connection structure according to an exemplary embodiment of the present invention.
Figure 5:
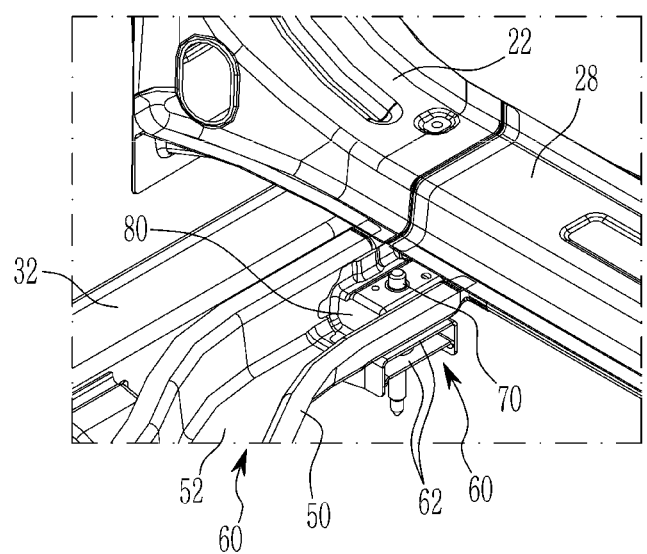
FIG. 5 and FIG. 6 are partial perspective views viewed from the inside of the vehicle body of the vehicle body rear connection structure according to an exemplary embodiment of the present invention.
Figure 6:
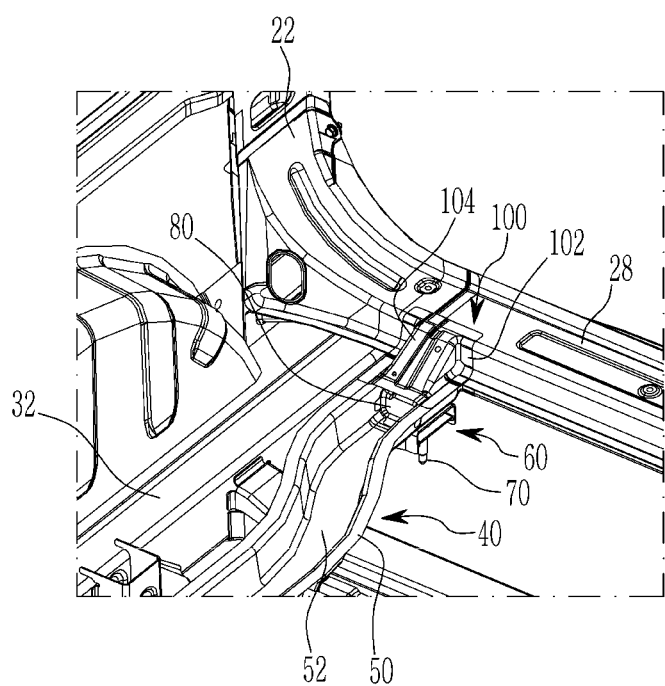

FIG. 4 is a partial perspective view viewed from the bottom of the vehicle body rear connection structure according to an exemplary embodiment of the present invention, and FIG. 5 and FIG. 6 are partial perspective views viewed from the inside of the vehicle body of the vehicle body rear connection structure according to an exemplary embodiment of the present invention.

Referring to FIG. 2 to FIG. 6, the vehicle body rear connection structure according to an exemplary embodiment of the present invention may further include a chassis frame bracket 60 connecting the longitudinal frame 32 and the rear side end body 46.

Figure 7:
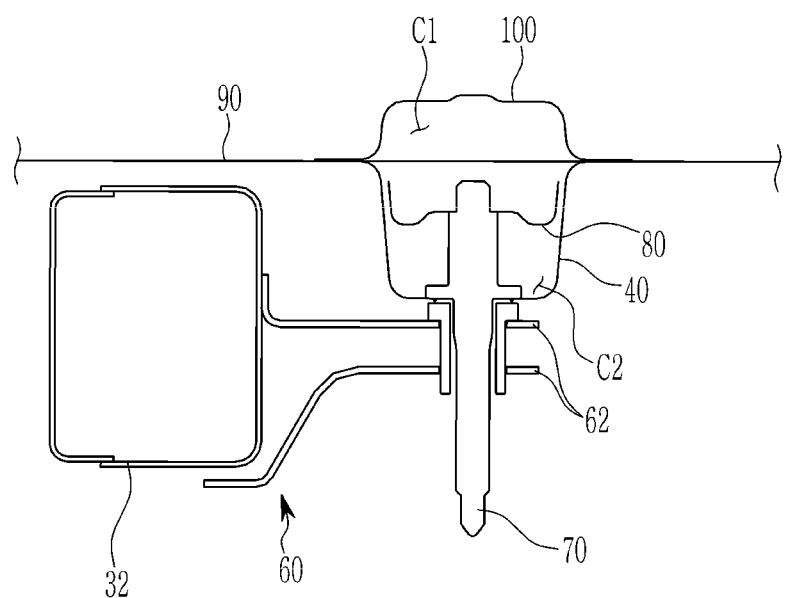
FIG. 7 is a cross-sectional view along line VII-VII of FIG. 4.

As shown in FIG. 5 and FIG. 7, the chassis frame bracket 6o may include at least two bracket panels 62.

The at least two bracket panels 62 may be disposed parallel up and down, respectively, to secure coupling rigidity between the longitudinal frame 32 and the rear side end body 46.

In addition, since the distance between the longitudinal frame 32 and the rear side end body 46 is relatively close, the connection strength by the chassis frame bracket 6o may be increased.

The vehicle body rear connection structure according to an exemplary embodiment of the present invention may further include a connection bolt 70 connecting the rear side end body 46 and the chassis frame bracket 60.

The vehicle body rear connection structure according to an exemplary embodiment of the present invention may further include a mounting bulk head 80 that is provided inside the rear side end body 46 and connected with the connection bolt 70.

The mounting bulk head 80 is provided inside the rear side end body 46 to reinforce the strength of the rear side end body 46, and the connection strength between the rear side end body 46 and the chassis frame bracket 60 can also be reinforced.

The vehicle body rear connection structure according to an exemplary embodiment of the present invention further includes a rear floor panel 90 provided at the rear of the vehicle body, and the rear side member 40 may include a side member flange 50 connected with the rear floor panel 90, and a side member protrude body 52 bent from the side member flange 50.

In FIG. 5 and FIG. 6, the rear floor panel 90 is omitted for convenience of understanding.

For example, the side member flange 50 and the rear floor panel 90 may be welded together, and the side member protrude body 52 formed by bending the side member flange 50 may increase the strength of the rear side member 40.

The mounting bulk head 80 may be connected with the side member flange 50 and the side member protrude body 52, increasing the strength of the rear side member 40.

Figure 8:
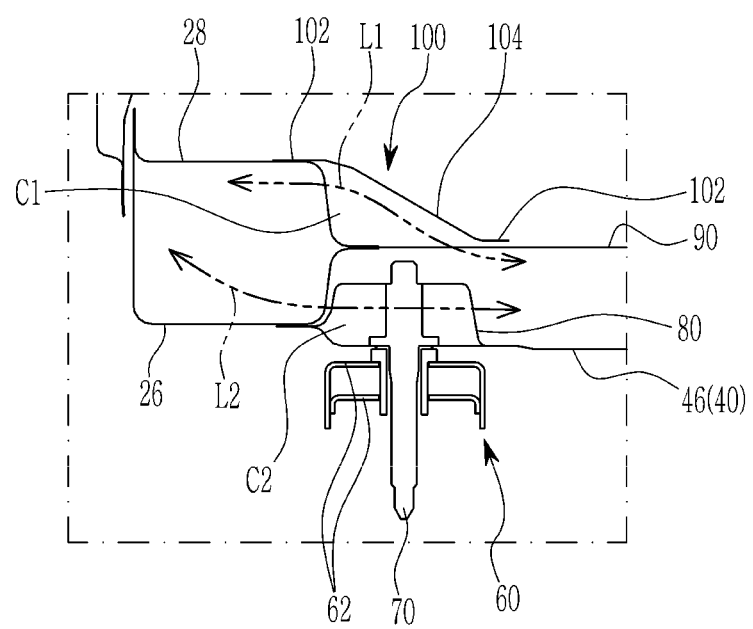
FIG. 8 is a cross-sectional view along the line VIII-VIII of FIG. 4.

FIG. 7 is a cross-sectional view along line VII-VII of FIG. 4, and FIG. 8 is a cross-sectional view along the line VIII-VIII of FIG. 4.

Referring to FIG. 6 to FIG. 8, the vehicle body rear connection structure according to an exemplary embodiment of the present invention may further include a gusset bracket 100 connecting the rear floor panel 90 and the lower portion of the tail gate frame 20 at the upper portion of the mount position of the connection bolt 70.

The gusset bracket 100 may include a gusset flange 102 connected to the rear floor panel 90 and the lower portion of the tail gate frame 20, and a gusset protrude portion 104 protruded from the gusset flange 102.

Here, the lower portion of the tail gate frame 20 means the rear cross member 28.

As shown in FIG. 7 and FIG. 8, the gusset bracket 100 and the rear floor panel 90 may form a first closed cross-section C1 therein.

In addition, the mounting bulk head 80 and the rear side member 40 may form a second closed cross-section C2 therein.

That is, the gusset bracket 100 and the rear floor panel 90, and the rear side member 40 and the mounting bulk head 80 form a double cross-section C1, and C2, respectively, at adjacent positions to distribute the collision load in the event of a vehicle collision and also it is possible to improve NVH performance.

For example, in the event of a rear collision of a vehicle, the collision load of the back panel member 26 and the rear cross member 28 forming the lower portion of the tail gate frame 20 may be transmitted through the first load pass L1 formed by the rear cross member 28, the gusset bracket 100 and the rear floor panel 90, also through the second load path L2 formed by the back panel member 26, the mounting bulk head 80 and the rear side member 40.

In other words, the adjacent double cross-sections C1 and C2 transfer the impact load smoothly and improve the NVH performance by securing the strength of the mounting part.

In addition, according to the vehicle body rear connection structure according to an exemplary embodiment of the present invention, it is possible to strengthen the coupling of the closed structure of the rear opening and the rear floor and the side members to the vehicle body to which the skateboard (chassis frame) is applied. So that the durability of the mounting part and the torsional strength of the vehicle may be enhanced.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A vehicle body comprising:
   a vehicle body skeleton comprising a tail gate frame and
      a rear side member connected to a lower portion of the tail gate frame, wherein the rear side member comprises a rear side connection body bent in a width direction of the vehicle body;
   a chassis frame comprising a longitudinal frame disposed in a length direction of the vehicle body; and
   a vehicle body rear connection structure configured to connect the vehicle body skeleton and the chassis frame, wherein the longitudinal frame is connected to an intersecting position of the lower portion of the tail gate frame and the rear side member.

2. The vehicle body of claim 1, wherein the lower portion of the tail gate frame comprises:
   a back panel member; and
   a rear cross member connected to an upper portion of the back panel member.

3. The vehicle body of claim 2, wherein the tail gate frame has a closed loop shape.

4. A vehicle body comprising:
   a vehicle body skeleton comprising a tail gate frame and a rear side member connected to a lower portion of the tail gate frame;
   a chassis frame comprising a longitudinal frame disposed in a length direction of the vehicle body; and
   a vehicle body rear connection structure configured to connect the vehicle body skeleton and the chassis frame, wherein the longitudinal frame is connected to an intersecting position of the lower portion of the tail gate frame and the rear side member, wherein the rear side member comprises:
   a rear side main body formed in the length direction of the vehicle body;
   a rear side connection body bent in a width direction of the vehicle body from the rear side main body; and
   a rear side end body that bends from the rear side connection body and is connected with the lower portion of the tail gate frame.

5. The vehicle body of claim 4, wherein the rear side connection body has a shape curved in a rear and outward direction of the vehicle body.

6. The vehicle body of claim 4, wherein the vehicle body rear connection structure further comprises:
   a chassis frame bracket connecting the longitudinal frame and the rear side end body.

7. The vehicle body of claim 6, wherein the vehicle body rear connection structure further comprises:
   a connection bolt connecting the rear side end body and the chassis frame bracket.

8. The vehicle body of claim 7, wherein the vehicle body rear connection structure further comprises:
   a mounting bulk head that is provided inside the rear side end body and connected with the connection bolt.

9. The vehicle body of claim 8, further comprising:
   a rear floor panel provided at a rear of the vehicle body, wherein the rear side member comprises:
     a side member flange connected with the rear floor panel; and
     a side member protrude body bent from the side member flange, wherein the mounting bulk head is connected with the side member flange and the side member protrude body.

10. The vehicle body of claim 9, further comprising:
    a gusset bracket connecting the rear floor panel and the lower portion of the tail gate frame at an upper portion of a mount position of the connection bolt.

11. The vehicle body of claim 10, wherein the gusset bracket comprises:
    a gusset flange connected to the rear floor panel and the lower portion of the tail gate frame; and
    a gusset protrude portion protruded from the gusset flange.

12. The vehicle body of claim 10, wherein the gusset bracket and the rear floor panel, and the rear side member and the mounting bulk head form a double cross-section respectively, at adjacent positions.

13. A vehicle body comprising:
    a vehicle body skeleton comprising a tail gate frame and a rear side member connected to a lower portion of the tail gate frame, wherein the rear side member comprises:
      a rear side main body formed in a length direction of the vehicle body;
      a rear side connection body bent in a width direction of the vehicle body from the rear side main body; and
      a rear side end body that bends from the rear side connection body and is connected with the lower portion of the tail gate frame;
    a chassis frame comprising a longitudinal frame disposed in the length direction of the vehicle body; and
    a vehicle body rear connection structure configured to connect the vehicle body skeleton and the chassis frame, wherein the longitudinal frame is connected to an intersecting position of the lower portion of the tail gate frame and the rear side member, wherein the vehicle body rear connection structure further comprises:
      a chassis frame bracket connecting the longitudinal frame and the rear side end body; and
      a connection bolt connecting the rear side end body and the chassis frame bracket.

14. The vehicle body of claim 13, wherein the lower portion of the tail gate frame comprises:
    a back panel member; and
    a rear cross member connected to an upper portion of the back panel member.

15. The vehicle body of claim 14, wherein the tail gate frame has a closed loop shape.

16. The vehicle body of claim 13, wherein the rear side connection body has a shape curved in a rear and outward direction of the vehicle body.

17. The vehicle body of claim 13, wherein the vehicle body rear connection structure further comprises:
    a mounting bulk head that is provided inside the rear side end body and connected with the connection bolt.

18. The vehicle body of claim 13, further comprising:
    a gusset bracket connecting a rear floor panel and the lower portion of the tail gate frame at an upper portion of a mount position of the connection bolt.

19. The vehicle body of claim 18, wherein the gusset bracket comprises:
    a gusset flange connected to the rear floor panel and the lower portion of the tail gate frame; and
    a gusset protrude portion protruded from the gusset flange.

20. The vehicle body of claim 4, wherein the lower portion of the tail gate frame comprises:
    a back panel member; and
    a rear cross member connected to an upper portion of the back panel member.

* * * * *